United States Patent
An et al.

(10) Patent No.: US 12,278,056 B2
(45) Date of Patent: Apr. 15, 2025

(54) MULTILAYER ELECTRONIC COMPONENT

(71) Applicant: SAMSUNG ELECTRO-MECHANICS CO., LTD., Suwon-si (KR)

(72) Inventors: So Jung An, Suwon-si (KR); Yoo Jeong Lee, Suwon-si (KR); Hyung Jong Choi, Suwon-si (KR); Chung Yeol Lee, Suwon-si (KR); Kwang Yeun Won, Suwon-si (KR); Woo Kyung Sung, Suwon-si (KR); Myung Jun Park, Suwon-si (KR); Jong Ho Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 153 days.

(21) Appl. No.: 18/085,037

(22) Filed: Dec. 20, 2022

(65) Prior Publication Data

US 2023/0260708 A1     Aug. 17, 2023

(30) Foreign Application Priority Data

Feb. 11, 2022   (KR) .......................... 10-2022-0018035

(51) Int. Cl.
*H01G 4/30*     (2006.01)
*H01G 4/012*    (2006.01)
(Continued)

(52) U.S. Cl.
CPC .............. *H01G 4/30* (2013.01); *H01G 4/012* (2013.01); *H01G 4/2325* (2013.01); *H01G 4/12* (2013.01)

(58) Field of Classification Search
None
See application file for complete search history.

(56) References Cited

U.S. PATENT DOCUMENTS

2008/0239617 A1 * 10/2008 Motoki .................... H01G 4/30
                                                                         29/25.42
2009/0291317 A1 * 11/2009 Kawasaki .............. H01G 4/232
                                                                         428/546

(Continued)

FOREIGN PATENT DOCUMENTS

JP      2004146401 A  *  5/2004
JP      2020-077784 A     5/2020
KR      10-2019-0067137 A  6/2019

*Primary Examiner* — Eric W Thomas
(74) *Attorney, Agent, or Firm* — Morgan, Lewis & Bockius LLP

(57) ABSTRACT

A multilayer electronic component includes a body including first and second surfaces opposing each other and third and fourth surfaces connected to the first and second surfaces and opposing each other, the body including dielectric layers and internal electrodes interposed between the dielectric layers, and an external electrode disposed on the body to be connected to the internal electrodes. The external electrode includes first and second plating layers respectively covering the third and fourth surfaces, a first electrode layer covering portions of the first and second surfaces and having one side surface in contact with one side surface of the first plating layer, a second electrode layer covering the portions of the first and second surfaces and having one side surface in contact with one side surface of the second plating layer, and third and fourth plating layers respectively covering the first and second plating layers.

16 Claims, 3 Drawing Sheets

(51) Int. Cl.
*H01G 4/232* (2006.01)
*H01G 4/12* (2006.01)

(56) References Cited

U.S. PATENT DOCUMENTS

| | | | | |
|---|---|---|---|---|
| 2009/0323253 A1* | 12/2009 | Kobayashi | ............ | H01G 4/005 |
| | | | | 427/79 |
| 2010/0118467 A1* | 5/2010 | Takeuchi | ............... | H01G 4/232 |
| | | | | 361/306.3 |
| 2013/0208401 A1* | 8/2013 | Shirakawa | ............ | H01G 13/06 |
| | | | | 216/13 |
| 2020/0152387 A1 | 5/2020 | Takeuchi et al. | | |

* cited by examiner

MULTILAYER ELECTRONIC COMPONENT

CROSS-REFERENCE TO RELATED APPLICATION(S)

This application claims benefit of priority to Korean Patent Application No. 10-2022-0018035 filed on Feb. 11, 2022 in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a multilayer electronic component, is a chip-type condenser commonly mounted on the printed circuit boards of various electronic products, such as image display devices including a liquid crystal display (LCD) and a plasma display panel (PDP), computers, smartphones, mobile phones, and the like, serving to charge and discharge electricity therein or therefrom.

The MLCC may be used as a component of various electronic products due to a small size, high capacitance, and ease of mountability thereof. As components of electronic devices have recently been miniaturized, demands for microminiaturization and high capacitance of multilayer ceramic capacitors have been increasing.

In order to increase an effective capacitance and reduce a size of a multilayer ceramic capacitor according to the demand for microminiaturization and high capacitance, it is essential to thin a dielectric layer and an internal electrode. In addition, it is advantageous to design a margin portion and an external electrode not involved in capacitance formation to be thinner.

SUMMARY

An aspect of the present disclosure provides a multilayer electronic component capable of achieving miniaturization by satisfying a thinner T size while having equivalent series resistance (ESR) lower than that of a conventional multilayer electronic component.

Another aspect of the present disclosure provides a multilayer electronic component with improved contact properties without lowering adhesion strength of an external electrode.

However, the aspects of the present disclosure are not limited to the above description, and will be more easily understood in the course of describing specific example embodiments of the present disclosure.

According to an aspect of the present disclosure, provided is a multilayer electronic component, the multilayer electronic component including a body including first and second surfaces opposing each other and third and fourth surfaces connected to the first and second surfaces and opposing each other, the body including a plurality of dielectric layers and a plurality of internal electrodes interposed between the plurality of dielectric layers and extending from the third and fourth surfaces, and an external electrode disposed on the body to be connected to the plurality of internal electrodes. The external electrode may include first and second plating layers covering the third and fourth surfaces, respectively, a first electrode layer covering first portions of the first and second surfaces and having one side surface in contact with one side surface of the first plating layer, a second electrode layer covering second portions of the first and second surfaces and having one side surface in contact with one side surface of the second plating layer, and third and fourth plating layers covering the first and second plating layers, respectively.

According to example embodiments of the present disclosure, it is possible to provide a multilayer electronic component capable of achieving miniaturization by satisfying a thinner T size while having ESR lower than that of a conventional multilayer electronic component.

In addition, according to example embodiments of the present disclosure, it is possible to provide a multilayer electronic component with improved contact properties without lowering adhesion strength of an external electrode.

However, various and beneficial advantages and effects of the present disclosure are not limited to the above description, and will be more easily understood in the course of describing specific example embodiments of the present disclosure.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
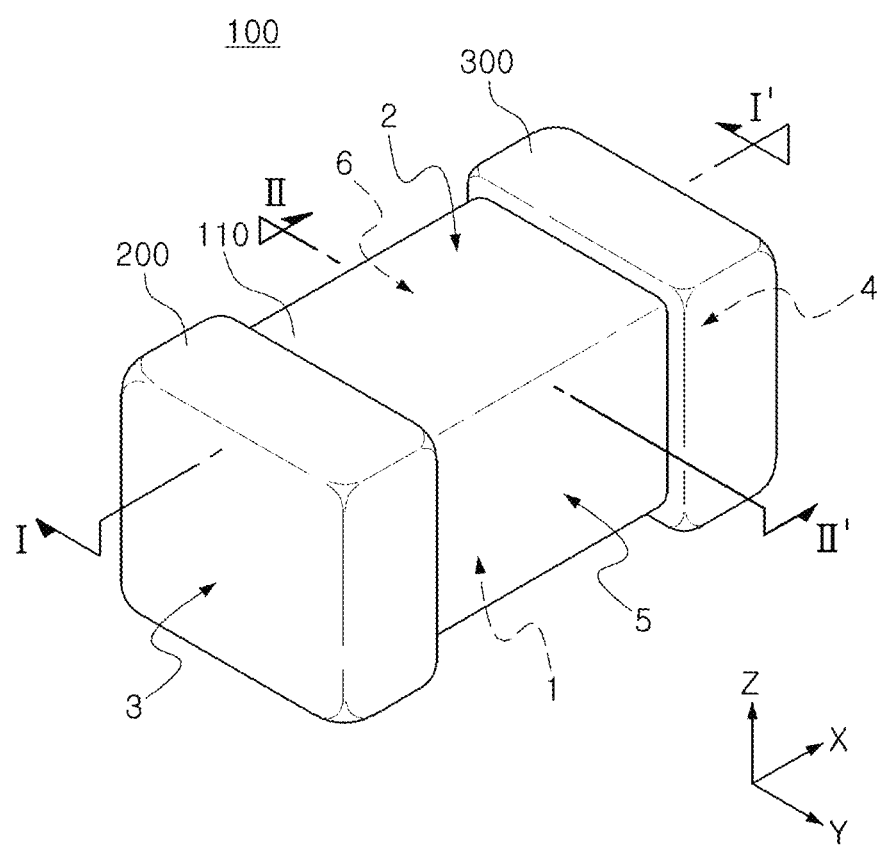
FIG. 1 is a perspective view schematically illustrating a multilayer electronic component according to an example embodiment of the present disclosure.

Hereinafter, example embodiments of the present disclosure will be described as follows with reference to the accompanying drawings. The present disclosure may, however, be exemplified in many different forms and should not be construed as being limited to the specific example embodiments set forth herein. In addition, example embodiments of the present disclosure may be provided for a more complete description of the present disclosure to those skilled in the art. Accordingly, the shapes and sizes of the elements in the drawings may be exaggerated for clarity of description, and the elements denoted by the same reference numerals in the drawings may be the same elements.

In order to clearly illustrate the present disclosure, portions not related to the description are omitted, and sizes and thicknesses are magnified in order to clearly represent layers and regions, and similar portions having the same functions within the same scope are denoted by similar reference numerals throughout the specification. Throughout the specification, when an element is referred to as "comprising" or "including," it means that it may include other elements as well, rather than excluding other elements, unless specifically stated otherwise.

In the drawings, an X-direction may be understood as a first direction, a longitudinal direction, or an L direction, a Y-direction may be understood as a second direction, a width direction, or a W direction, and a Z direction may be understood as a third direction, a thickness direction, or a stacking direction, or a T direction, but the present disclosure is not limited thereto.

Multilayer Electronic Component

FIG. 1 is a perspective view schematically illustrating a multilayer electronic component according to an example embodiment of the present disclosure.

Figure 2:
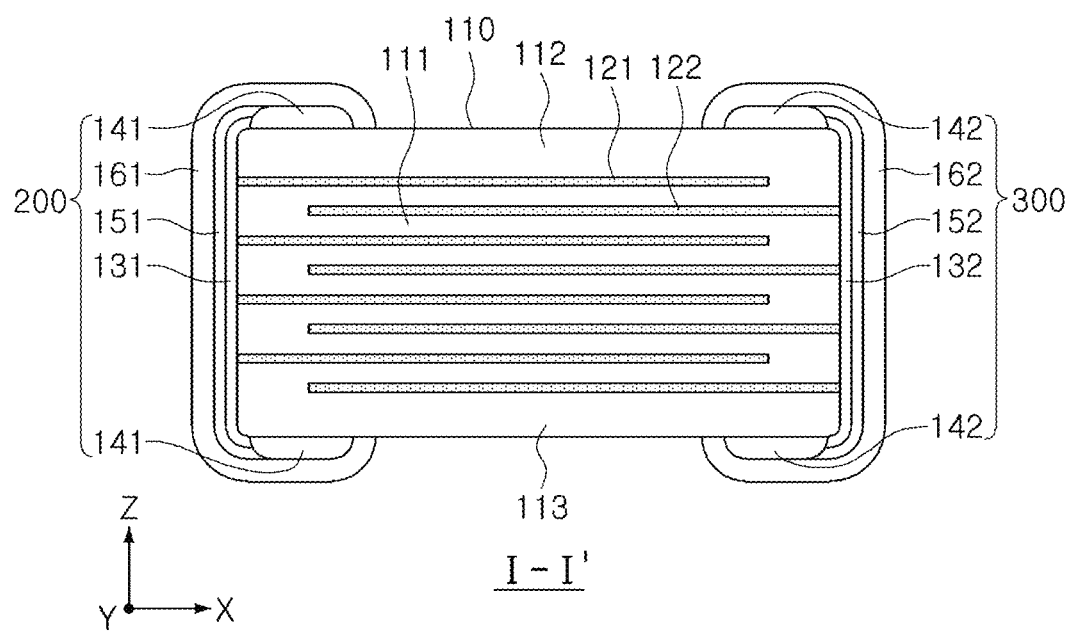
FIG. 2 schematically illustrates a cross-sectional view taken along line I-I' of FIG. 1.

FIG. 2 schematically illustrates a cross-sectional view taken along line I-I' of FIG. 1.

Figure 3:
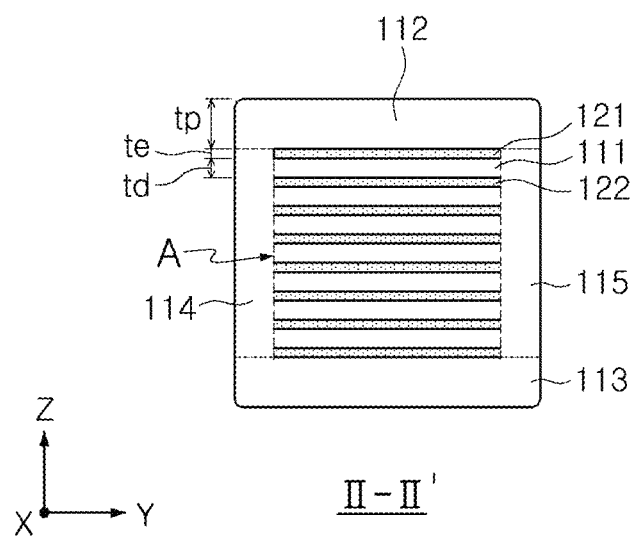
FIG. 3 schematically illustrates a cross-sectional view taken along line II-II' of FIG. 1.

FIG. 3 schematically illustrates a cross-sectional view taken along line II-II' of FIG. 1.

Figure 4:
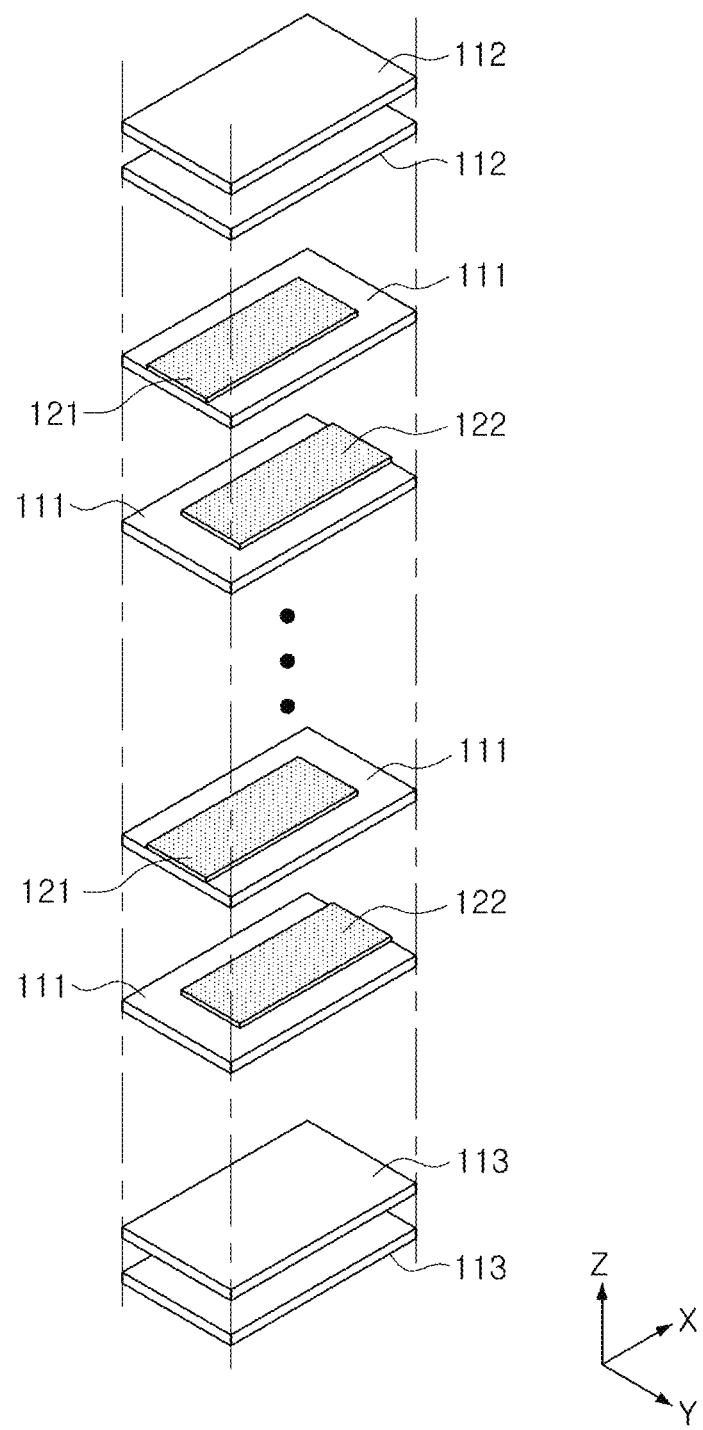
FIG. 4 is an exploded perspective view schematically illustrating a body in which a dielectric layer and an internal electrode are stacked according to an example embodiment of the present disclosure.

FIG. 4 is an exploded perspective view schematically illustrating a body in which a dielectric layer and an internal electrode are stacked according to an example embodiment of the present disclosure.

Hereinafter, a multilayer electronic component according to an example embodiment of the present disclosure will be described in detail with reference to FIGS. 1 to 4.

A multilayer electronic component 100 according to an example embodiment of the present disclosure may include a body including a plurality of dielectric layers 111 and a plurality of internal electrodes 121 and 122 interposed between the plurality of dielectric layers, and external electrodes 200 and 300 disposed on the body to be connected to the plurality of internal electrodes 121 and 122.

The body 110 may include the plurality of dielectric layers 111 and the internal electrodes 121 and 122 interposed between the plurality of dielectric layers 111. In the body 110, the dielectric layer 111 and the internal electrodes 121 and 122 may be alternately stacked.

A specific shape of the body 110 is not particularly limited, but as illustrated, the body 110 may have a hexahedral shape or a shape similar thereto. Due to shrinkage of ceramic powder particles included in the body 110 during a sintering process, the body 110 may not have a hexahedral shape with entirely straight lines, but may have a substantially hexahedral shape.

The body 110 may include first and second surfaces 1 and 2 opposing each other, and third and fourth surfaces 3 and 4 connected to the first and second surfaces 1 and 2 and opposing each other.

Specifically, the body 110 may include the first and second surfaces 1 and 2 opposing each other in a thickness direction (Z direction), the third and fourth surfaces 3 and 4 connected to the first and second surfaces 1 and 2 and opposing each other in a longitudinal direction (X-direction), and fifth and sixth surfaces 5 and 6 connected to the third and fourth surfaces 3 and 4 and opposing each other in a width direction (Y-direction).

The plurality of dielectric layers 111 forming the body 110 may be in a sintered state, and adjacent dielectric layers 111 may be integrated with each other so that boundaries therebetween are not readily apparent without using a scanning electron microscope (SEM).

According to an example embodiment of the present disclosure, a raw material for forming the dielectric layer 111 is not particularly limited as long as sufficient capacitance is obtainable therewith. For example, a barium titanate-based material, a lead composite perovskite-based material, a strontium titanate-based material, or the like may be used. The barium titanate-based material may include $BaTiO_3$-based ceramic powder. The ceramic powder may include, for example, $(Ba_{1-x}Ca_x)TiO_3$, $Ba(Ti_{1-y}Ca_y)O_3$, $(Ba_{1-x}\ Ca_x)\ (Tl_{1-y}Zr_y)O_3$, $Ba(Ti_{1-y}Zr_y)O_3$, or the like in which calcium (Ca), zirconium (Zr), and the like are partially dissolved.

As a material for forming the dielectric layer 111, various ceramic additives, organic solvents, binders, dispersants, and the like may be added to powder such as barium titanate ($BaTiO_3$) according to the purpose of the present disclosure.

The internal electrodes 121 and 122 may be disposed alternately with the dielectric layer 111 in a thickness direction (Z direction). The internal electrodes 121 and 122 may include a first internal electrode 121 and a second internal electrode 122. The first and second internal electrodes 121 and 122 may be alternately disposed to oppose each other with the dielectric layer 111 included the body 110 interposed therebetween, and may be exposed to (or extend from) the third and fourth surfaces 3 and 4 of the body 110, respectively.

Referring to FIG. 2, the first internal electrode 121 may be spaced apart from the fourth surface 4 and may be exposed through (or extend from) the third surface 3, and the second internal electrode 122 may be spaced apart from the third surface 3 and may be exposed through (or extend from) the fourth surface 4.

That is, the first and second internal electrodes 121 and 122 may be alternately exposed to (or extend from) the third surface 3 and the fourth surface 4 that are opposite surfaces in a longitudinal direction (X-direction) of a body to be exposed to (or extend from) first and second external electrodes 200 and 300, respectively. The first internal electrode 121 may not connected to the second external electrode 300, but may be connected to the first external electrode 200. In addition, the second internal electrode 122 may not connected to the first external electrode 200 but may be connected to the second external electrode 300. Accordingly, the first internal electrode 121 may be formed to be spaced apart from the fourth surface 4 by a predetermined distance, and the second internal electrode 122 may be formed to be spaced apart from the third surface 3 by a predetermined distance.

In this case, the first and second internal electrodes 121 and 122 may be electrically isolated from each other by the dielectric layer 111 disposed therebetween.

A material for forming the first and second internal electrodes 121 and 122 is not particularly limited, and the first and second internal electrodes 121 and 122 may be formed using, for example, a conductive paste formed of at least one material of a noble metal material such as palladium (Pd) or a palladium-silver (Pd—Ag) alloy, nickel (Ni), and copper (Cu).

A method for printing the conductive paste may use a screen-printing method, a gravure printing method, or the like, but the present disclosure is not limited thereto.

Referring to FIG. 4, the body 110 may be formed by alternately stacking a ceramic green sheet on which the first internal electrode 121 is printed and a ceramic green sheet on which the second internal electrode 122 is printed, and then sintering the ceramic green sheets.

An average thickness to of the internal electrodes 121 and 122 does need to be particularly limited. However, in order to more easily achieve miniaturization and implementation of high capacitance of a multilayer electronic component, the average thickness te of the internal electrodes 121 and 122 may be in the range of 100 nm to 1.5 μm.

A method for measuring the average thickness te of the internal electrodes 121 and 122 described above is not particularly limited. However, for example, with respect to ten arbitrary samples of the multilayer electronic component 100, the average thickness te of the internal electrodes 121 and 122 may be measured by scanning, with an SEM, an image of a cross-section of the body 110 in a length and thickness direction (L-T).

For example, with respect to arbitrary first and second internal electrodes 121 and 122 extracted from an image obtained by scanning, with the SEM, a cross-section in a X and Z direction (length and thickness direction) cut from a central portion in a Y-direction (width direction) of the body 110, a thickness thereof may be measured at thirty equally spaced apart points in a longitudinal direction, thereby measuring an average value thereof.

The body 110 may include a capacitance formation portion A in which a capacitance is formed by including a first internal electrode 121 and a second internal electrode 122 disposed in the body 110 and disposed to oppose each other with a dielectric layer 111 interposed therebetween, and cover portions 112 and 113 formed on upper and lower portions of the capacitance formation portion A.

In addition, the capacitance formation portion A, a portion contributing to capacitance formation of a capacitor, may be formed by repeatedly stacking a plurality of first and second internal electrodes 121 and 122 with the dielectric layer 111 interposed therebetween.

The upper cover portion 112 and the lower cover portion 113 may be formed by respectively stacking a single dielectric layer or two or more dielectric layers on upper and lower surfaces of the capacitance formation portion A in a thickness direction, and may basically serve to prevent damage to an internal electrode caused by physical or chemical stress.

The upper cover portion 112 and the lower cover portion 113 may not include an internal electrode, and may include the same material as that of the dielectric layer 111.

That is, the upper cover portion 112 and the lower cover portion 113 may include a ceramic material, for example, a barium titanate (BaTiO$_3$)-based ceramic material.

A thickness of each of the cover portions 112 and 113 do not need to be particularly limited. However, in order to more easily achieve miniaturization and implementation of high capacitance of a multilayer electronic component, a thickness tp of each of the cover portions 112 and 113 may be 20 μm or less.

In addition, margin portions 114 and 115 may be disposed on side surfaces of the capacitance formation portion A, respectively.

The margin portions 114 and 115 may include the margin portion 114 disposed on the sixth surface 6 of the body 110 and the margin portion 115 disposed on the fifth surface 5 of the body 110. That is, the margin portions 114 and 115 may be disposed on opposite side surfaces of the ceramic body 110 in a width direction (Y-direction).

As illustrated in FIG. 3, the margin portions 114 and 115 may refer to regions between opposite ends of the first and second internal electrodes 121 and 122 and boundaries of the body 110 in a cross-section of the body 110 cut in a width-thickness (W-T) direction.

The margins portions 114 and 115 may basically serve to prevent damage to an internal electrode caused by physical or chemical stress.

The margin portions 114 and 115 may be formed by coating a conductive paste on a ceramic green sheet except a portion where a margin portion is to be formed so as to form an internal electrode.

Alternatively, in order to suppress a step difference caused by the internal electrodes 121 and 122, the internal electrodes 121 and 122 may be cut to be exposed to (or extend from) the fifth and sixth surfaces 5 and 6 of the body 110 after being stacked, and then a single dielectric layer or two or more dielectric layers may be stacked on opposite side surfaces of the capacitance formation portion A in a width direction, thereby forming the margin portions 114 and 115.

The external electrodes 200 and 300 may be disposed on the body 110, and may be connected to the internal electrodes 121 and 122.

As illustrated in FIG. 2, the external electrodes 200 and 300 disposed on the third and fourth surfaces 3 and 4 of the body 110, respectively, and connected to the first and second internal electrodes 121 and 122, respectively, may be included.

In the present embodiment, a structure in which the multilayer electronic component 100 has two external electrodes 200 and 300 is described, but the number or shapes of the external electrodes 200 and 300 may be changed according to shapes of the internal electrodes 121 and 122 or other purposes.

The demand for microminiaturization and high capacitance for multilayer ceramic capacitors has continued. In order to increase an effective capacitance and reduce a size, it may be advantageous to design a margin portion or an external electrode that are not involved in capacitance to be thin in addition to thinning of an internal electrode and a dielectric layer.

In this case, the external electrode may electrically connect an internal electrode and an external circuit to each other, and physically adhere a chip to a substrate.

However, among external electrodes, an external electrode formed on third and fourth surfaces (or W-T surfaces) of a body may be a portion implementing electrical connectivity with an internal electrode. Conversely, an external electrode (that is, a band portion) formed on portions of first and second surfaces (or L-W surfaces) or fifth and sixth surfaces (or L-T surfaces) of the body may be a portion for adhesion to a substrate.

A sintered-type external electrode including glass may have excellent adhesion strength due to high adhesion to a ceramic body. However, when sintering conditions are not appropriate, there is a possibility that contact properties with an internal electrode may be lowered due to glass behavior.

Accordingly, the present inventors conducted intensive research to resolve the above-described issue, and proposed a structure in which an electrode layer including no glass is disposed directly on portions of first and second surfaces (or fifth and sixth surfaces) of a body, and a plating layer is disposed directly on third and fourth surfaces.

Accordingly, according to the present disclosure, it is possible to provide a multilayer electronic component capable of achieving miniaturization by satisfying a thinner T size while having equivalent series resistance (ESR) lower than that of a conventional one. In addition, it is possible to provide a multilayer electronic component having improved contact properties without lowering adhesion strength of an external electrode.

A schematic structure of a multilayer electronic component according to an example embodiment of the present disclosure is illustrated in FIG. 2.

Specifically, the external electrodes 200 and 300 may include first and second plating layers 131 and 132 covering the third and fourth surfaces 3 and 4 of the body 110, respectively. Accordingly, as illustrated in FIG. 2, the third surface 3 of the body 110 may be covered by the first plating layer 131, and the fourth surface 4 of the body 110 may be covered by the second plating layer 132.

According to an example embodiment of the present disclosure, the first and second plating layers 131 and 132 may be formed of a material having excellent electrical conductivity, and a conductive metal may be typically used. For example, the conductive metal included in the first and second plating layers 131 and 132 may include copper (Cu) and the like, and the first and second plating layers 131 and 132 may include, as a main component, copper (that is, 80 wt % or more of copper).

Accordingly, according to an example embodiment of the present disclosure, the first and second plating layers 131 and 132 may be copper plating layers.

In general, an external electrode disposed on portions of first and second surfaces (or L-W surfaces) or fifth and sixth surfaces (or L-T surfaces) formed for purpose of adhesion to a substrate may be formed through a dipping process. However, when the external electrode is formed only through the dipping process, it may be difficult to secure moisture-resistance reliability due to vulnerability to edge breakage, and to control a T size, which may be disadvantageous in thinning.

Accordingly, in related art, a nickel electrode layer was formed on portions of first and second surfaces (or L-W surfaces) in order to thin an external electrode. In addition, a structure was developed in which a copper electrode layer is formed to cover portions of the above-described nickel electrode layer and third and fourth surfaces (or W-T surfaces). In this case, the nickel electrode layer was manufactured in a sintered type electrode layer including no glass, and the copper electrode layer was manufactured as a sintered type electrode layer using a paste including glass.

However, in the above-described art, the copper electrode layer disposed on the third and fourth surfaces 3 and 4 of the body 110 was manufactured using a sintered-type paste including glass. Thus, when the sintering conditions were not appropriate, there was an issue such as a reduction in contact properties with an internal electrode caused by glass behavior.

Accordingly, in the present disclosure, it was found that it is possible to secure electrical connectivity by forming a copper plating layer instead of a copper electrode layer on the surfaces 3 and 4 of the body 110 to which an internal electrode is exposed (or from which the internal electrode extends) after forming a nickel electrode layer on portions of the first and second surfaces 1 and 2 of the body 110.

That is, when the first and second plating layers 131 and 132 are formed to cover the above-described third and fourth surfaces 3 and 4, respectively, a copper metal may be directly plated instead of a paste including glass, and thus it can be expected to improve contact properties with the internal electrode. In some embodiments, the first and second plating layers 131 and 132 may be free of glass.

According to the present disclosure, an oxide layer may be formed on the nickel electrode layer formed on portions of the first and second surfaces 1 and 2, so that copper may not be grown, whereas the first and second plating layers 131 and 132 are formed as copper plating layers only on the third and fourth surfaces 3 and 4, respectively, on which the above-described nickel electrode layer is not formed, thereby reducing a T size and securing an effective volume.

In addition, the external electrodes 200 and 300 may include first and second plating layers 131 and 132 covering the third and fourth surfaces 3 and 4 of the body 110 described above.

The external electrodes 200 and 300 may include first and second electrode layers 141 and 142 covering portions of the first and second surfaces 1 and 2 of the body 110. Accordingly, as illustrated in FIG. 2, the first electrode layer 141 and the second electrode layer 142 may be disposed on opposite ends in a longitudinal direction (X-direction) of the body 110, respectively. In other words, the first electrode layer 141 may be disposed on the first and second surfaces 1 and 2 of one end in the longitudinal direction (X-direction) while the second electrode layer 142 is disposed on the first and second surfaces 1 and 2 of the other end in the longitudinal direction (X-direction).

In this case, according to an example embodiment of the present disclosure, the first and second electrode layers 141 and 142 may cover the portions of the first and second surfaces 1 and 2 of the body 110 described above while also covering portions of the fifth and sixth surfaces 5 and 6.

That is, according to an example embodiment of the present disclosure, the first and second electrode layers 141 and 142 may be provided on a band portion that is the opposite ends in the longitudinal direction (X-direction) of the body 110 so as to cover the portions of the first and second surfaces 1 and 2, and the portions of the fifth and sixth surfaces 5 and 6 of the body 110.

In this case, one side surface of the first electrode layer 141 may be in contact with one side surface of the first plating layer 131, and one side surface of the second electrode layer 142 may be in contact with one side surface of the second plating layer 132. As described above, in order to manufacture a multilayer electronic component according to the present disclosure, first and second electrode layers may be formed on portions of the first and second surfaces 1 and 2 of the body 110, and then first and second plating layers may be formed on the third and fourth surfaces. Accordingly, as illustrated in FIG. 2, the one side surface of the first electrode layer 141 may be formed to be in contact with the one side surface of the first plating layer 131, and the one side surface of the second electrode layer 142 may be formed to be in contact with the one side surface of the second plating layer 132.

According to an example embodiment of the present disclosure, in order to secure a very thin T size and thin an external electrode, the first and second electrode layers 141 and 142 may be formed in a sintered type including no glass. In addition, as illustrated in FIG. 2, in an external electrode region provided on the first and second surfaces 1 and 2 (or the fifth and sixth surfaces 5 and 6) of the body 110, third and fourth plating layers 151 and 152 may not be present under fifth and sixth plating layers 161 and 162. Thus, in order to prevent a reduction in solderability, the first and second electrode layers 141 and 142 may need to be formed in a glass-free sintered type. A method for forming the first and second electrode layers 141 and 142 in the glass-free sintering type may include a sputtering method or the like.

In addition, according to an example embodiment of the present disclosure, the first and second electrode layers 141 and 142 may be formed of a material having excellent electrical conductivity, and a conductive metal may be typically used. For example, the conductive metal included in the first and second electrode layers 141 and 142 may include nickel (Ni) and the like, and the first and second electrode layers 141 and 142 may include, as a main component, nickel (that is, 80 wt % or more of nickel).

Accordingly, according to an example embodiment of the present disclosure, the first and second electrode layers 141 and 142 may be nickel electrode layers.

In addition, the external electrodes 200 and 300 may include third and fourth plating layers 151 and 152 covering the first and second plating layers 131 and 132, respectively, described above. Accordingly, as illustrated in FIG. 2, the third plating layer 151 may cover the first plating layer 131, and the fourth plating layer 152 may cover the second plating layer 132.

According to an example embodiment of the present disclosure, the third and fourth plating layers 151 and 152 may be formed of a material having excellent electrical conductivity, and a conductive metal may be typically used. However, the third plating layer 151 may be formed of a conductive metal material different from that of the first plating layer 131, and the fourth plating layer 152 may be formed of a conductive metal material different from that of the second plating layer 132. Accordingly, for example, the conductive metal included in the third and fourth plating layers 151 and 152 may include nickel (Ni) and the like, and the third and fourth plating layers 151 and 152 may include, as a main component, nickel (that is, 80 wt % or more of nickel).

Accordingly, according to an example embodiment of the present disclosure, the third and fourth plating layers 151 and 152 may be nickel plating layers.

In the present disclosure, the third and fourth plating layers 151 and 152 may be formed for the purpose of preventing poor leaching of a conductive metal component of the first and second plating layers 131 and 132 provided thereunder. Accordingly, in order to prevent poor leaching of Cu from a copper plating layer that is a typical example of the first and second plating layers 131 and 132, third and fourth plating layers formed of a different conductive component may be disposed.

According to an example embodiment of the present disclosure, as described above, during a manufacturing process, after the first and second electrode layers 141 and 142 are formed, the third and fourth plating layers 151 and 152 may be formed only on the first and second plating layers 131 and 132 that are copper plating layers due to an oxide layer present on the first and second electrode layers 141 and 142, as described in FIG. 2.

Accordingly, according to an example embodiment of the present disclosure, third and fourth plating layers 151 and 152 (for example, nickel plating layers) may not be provided (disposed) on the first and second electrode layers 141 and 142. In some embodiments, a surface of the first electrode layer 141 facing away from the first surface may not be covered by the third plating layer 151. In some embodiments, a surface of the second electrode layer 142 facing away from the first surface may not be covered by the fourth plating layer 152.

According to an example embodiment of the present disclosure, a ratio at which the first and second electrode layers 141 and 142 are in contact with the third and fourth plating layers 151 and 152 (for example, nickel plating layers) may be 10% or less.

In this case, a method for measuring the above-described ratio at which the first and second electrode layers 141 and 142 are in contact with the third and fourth plating layers 151 and 152 is not particularly limited. However, for example, with respect to ten arbitrary samples of the multilayer electronic component 100, it is possible to perform measurement based on an external electrode extracted from an image obtained by scanning, with an SEM, a cross-section in a X and Z direction (length and thickness direction) cut from a central portion in a Y-direction (width direction) of the body 110 at a magnification of 1000 times or more.

Accordingly, the ratio may be obtained by measuring, based on a cross-section of the multilayer electronic component 100 illustrated in FIG. 2, a ratio (L2/L1*100) of a length (L2) of surfaces of the first and second electrode layers 141 and 142 in contact with the third and fourth plating layers 151 and 152 to a length L1 of an entire surface excluding surfaces of the first and second electrode layers 141 and 142 in contact with the body 110.

Conversely, according to an example embodiment of the present disclosure, a ratio at which the first and second plating layers 131 and 132 are in contact with the third and fourth plating layers 151 and 152 (for example, nickel plating layers) may be 80% or more.

In this case, a method for measuring the above-described ratio at which the first and second plating layers 131 and 132 are in contact with the third and fourth plating layers 151 and 152 (for example, nickel plating layers) is not particularly limited. However, for example, with respect to ten arbitrary samples of the multilayer electronic component 100, it is possible to perform measurement based on an external electrode extracted from an image obtained by scanning, with an SEM, a cross-section in a X and Z direction (length and thickness direction) cut from a central portion in a Y-direction (width direction) of the body 110 at a magnification of 1000 times or more.

Accordingly, the ratio may be obtained by measuring, based on a cross-section of the multilayer electronic component 100 illustrated in FIG. 2, a ratio (L4/L3*100) of a length (L4) of surfaces of the first and second plating layers 131 and 132 in contact with the third and fourth plating layers 151 and 152 to a length L3 of an entire surface excluding surfaces of the first and second plating layers 131 and 132 in contact with the body 110.

In addition, according to an example embodiment of the present disclosure, one side surface of the third plating layer 151 may be in contact with one side surface of the first electrode layer 141, and one side surface of the fourth plating layer 152 may be in contact with one side surface of the second electrode layer 142. As described above, after the first and second electrode layers 141 and 142 are formed, the first and second plating layers 131 and 132 may be formed, and then the third and fourth plating layers 151 and 152 may be formed. Accordingly, the one side surface of the third plating layer 151 may be formed to be in contact with the one side surface of the first electrode layer 141, and the one side surface of the fourth plating layer 152 may be formed to be in contact with the one side surface of the second electrode layer 142. In this case, the third plating layer 151 and the fourth plating layer 152 may be formed through an electrolytic plating process. Using the electrolytic plating process, a Ni plating layer may be formed only on the first and second plating layers 131 and 132, and the Ni plating layer may not be formed on the first and second electrode layers 141 and 142 (for example, Ni electrode layers) on which an oxide layer is formed.

Accordingly, according to an example embodiment of the present disclosure, a sum of an average thickness of the first plating layer 131 and an average thickness of the third plating layer 151 may be less than or equal to an average thickness of the first electrode layer 141. Similarly, a sum of an average thickness of the second plating layer 132 and an average thickness of the fourth plating layer 152 may be less than or equal to an average thickness of the second electrode layer 142.

In this case, a method for measuring a thickness of each layer described above is not particularly limited. However, for example, with respect to ten arbitrary samples of the multilayer electronic component 100, it is possible to perform measurement based on an external electrode extracted from an image obtained by scanning, with an SEM, a cross-section in a X and Z direction (length and thickness direction) cut from a central portion in a Y-direction (width direction) of the body 110 at a magnification of 1000 times or more.

For example, based on a cross-section of the multilayer electronic component 100 illustrated in FIG. 2, an average thickness of the first to fourth plating layers 131, 132, 151, and 152 may be measured by obtaining an average value of a thickness of each layer at ten arbitrary equally spaced apart points measured in a longitudinal direction (X-direction). In addition, an average thickness of the first and second electrode layers 141 and 142 may be measured by obtaining an average value of a thickness of each of first and second electrode layers at ten arbitrary equally spaced apart points measured in a thickness direction (Z direction).

According to an example embodiment of the present disclosure, the multilayer electronic component may further include a fifth plating layer 161 covering the first electrode layer 141 and the third plating layer 151, and a sixth plating layer 162 covering the second electrode layer 142 and the fourth plating layer 152. In some embodiments, a surface of the first electrode layer 141 facing away from the first surface may be covered by the fifth plating layer 161. In some embodiments, a surface of the second electrode layer 142 facing away from the first surface may be covered by the sixth plating layer 162.

According to an example embodiment of the present disclosure, the fifth and sixth plating layers 161 and 162 may be formed of a material having excellent electrical conductivity, and a conductive metal may be typically used.

In this case, types of the fifth and sixth plating layers 161 and 162 are not particularly limited, but may be formed of a conductive metal material different from those of the third and fourth plating layers 151 and 152. For example, the conductive metal included in the fifth and sixth plating layer 161 and 162 may include tin (Sn) and the like, and the fifth and sixth plating layer 161 and 162 may include, as a main component, tin (that is, 80 wt % or more of tin).

Accordingly, according to an example embodiment of the present disclosure, the fifth and sixth plating layers 161 and 162 may be tin plating layers.

According to an example embodiment of the present disclosure, the fifth and sixth plating layers 161 and 162 may serve to improve mounting characteristics. Accordingly, as described above, in order to form the fifth and sixth plating layers 161 and 162, after the third and fourth plating layers 151 and 152 are formed, oxides present on surfaces thereof may be removed through dry polishing, and fifth and sixth plating layers may be formed to cover all portions except a ceramic body portion (that is, upper portions of the first and second electrode layers 141 and 142 and upper portions of third and fourth plating layers 151 and 152), thereby securing mountability.

A size of the multilayer electronic component 100 does not need to be particularly limited.

However, in order to achieve miniaturization and implementation of high capacitance at the same time, it may be necessary to increase the number of stacks by reducing thicknesses of a dielectric layer and an internal electrode, and thus the multilayer electronic component 100 having a size of 0402 (length×width, 0.4 mm×0.2 mm) or less may have a more significant reliability improvement effect according to the present disclosure.

Accordingly, in consideration of a manufacturing error, an external electrode size, and the like, when the multilayer electronic component 100 has a length of 0.44 mm or less and a width of 0.22 mm or less, the reliability improvement effect according to the present disclosure may be more significant. Here, the length of the multilayer electronic component 100 may refer to a maximum size of the multilayer electronic component 100 in a second direction, and the width of the multilayer electronic component 100 may refer to a maximum size of the multilayer electronic component 100 in a third direction.

While example embodiments have been shown and described above, it will be apparent to those skilled in the art that modifications and variations could be made without departing from the scope of the present invention as defined by the appended claims.

What is claimed is:

1. A multilayer electronic component comprising:
a body including first and second surfaces opposing each other and third and fourth surfaces connected to the first and second surfaces and opposing each other, the body including a plurality of dielectric layers and a plurality of internal electrodes interposed between the plurality of dielectric layers and extending from the third and fourth surfaces; and
an external electrode disposed on the body to be connected to the plurality of internal electrodes,
wherein the external electrode includes:
a first plating layer covering the third surface;
a second plating layer covering the fourth surface;
a first electrode layer covering first portions of the first and second surfaces and having one side surface in contact with one side surface of the first plating layer;
a second electrode layer covering second portions of the first and second surfaces and having one side surface in contact with one side surface of the second plating layer;
a third plating layer covering the first plating layer, where a surface of the first electrode layer facing away from the first surface is not covered by the third plating layer; and
a fourth plating layer covering the second plating layer.

2. The multilayer electronic component of claim 1, wherein the first and second plating layers are copper plating layers.

3. The multilayer electronic component of claim 1, wherein the third and fourth plating layers are nickel plating layers.

4. The multilayer electronic component of claim 1, wherein the first and second electrode layers are nickel electrode layers.

5. The multilayer electronic component of claim 1, further comprising:
a fifth plating layer covering the first electrode layer and the third plating layer; and
a sixth plating layer covering the second electrode layer and the fourth plating layer.

6. The multilayer electronic component of claim 5, wherein the fifth and sixth plating layers are tin plating layers.

7. The multilayer electronic component of claim 1, wherein the third and fourth plating layers are not disposed on the first and second electrode layers.

8. The multilayer electronic component of claim 1, wherein
one side surface of the third plating layer is in contact with the one side surface of the first electrode layer, and
one side surface of the fourth plating layer is in contact with the one side surface of the second electrode layer.

9. The multilayer electronic component of claim 1, wherein the first electrode layer is free of glass.

10. The multilayer electronic component of claim 1, wherein the second electrode layer is free of glass.

11. The multilayer electronic component of claim 1, wherein the first plating layer is free of glass.

12. The multilayer electronic component of claim 1, wherein the second plating layer is free of glass.

13. The multilayer electronic component of claim 1, the surface of the first electrode layer facing away from the first surface is covered by a fifth plating layer.

14. The multilayer electronic component of claim 1, a surface of the second electrode layer facing away from the first surface is not covered by the fourth plating layer.

15. The multilayer electronic component of claim 14, the surface of the second electrode layer facing away from the first surface is covered by a sixth plating layer.

16. The multilayer electronic component of claim 1, wherein a ratio, $L2/L1*100$ of a length, $L2$, of surfaces of the first and second electrode layers in contact with the third and fourth plating layers to a length, $L1$, of an entire surface excluding surfaces of the first and second electrode layers in contact with the body is 10% or less.

* * * * *